(12) United States Patent
Shimizu et al.

(10) Patent No.: US 6,791,291 B2
(45) Date of Patent: Sep. 14, 2004

(54) MULTI-JOINT TYPE INDUSTRIAL ROBOT AND ARM UNIT THEREOF

(75) Inventors: Shinji Shimizu, Kiryu (JP); Noriyoshi Kikuchi, Kiryu (JP); Katsuhiro Yamazoe, Okayama (JP); Takahiro Kobiki, Fukuyama (JP)

(73) Assignees: Japan Servo Co., Ltd., Tokyo (JP); Tazmo Co., Ltd., Okayama (JP)

( * ) Notice: Subject to any disclaimer, the term of this patent is extended or adjusted under 35 U.S.C. 154(b) by 0 days.

(21) Appl. No.: 10/259,150

(22) Filed: Sep. 27, 2002

(65) Prior Publication Data

US 2003/0062858 A1 Apr. 3, 2003

(30) Foreign Application Priority Data

Oct. 1, 2001 (JP) .......................................... 2001-305704

(51) Int. Cl.[7] .................................................. B25J 9/16
(52) U.S. Cl. ............................. 318/568.1; 318/568.12; 318/568.11; 318/568.21
(58) Field of Search .......................... 318/568.1, 568.11, 318/568.12, 568.21, 565.1; 700/245, 249, 568.13, 568.19; 901/28, 9, 15, 22

(56) References Cited

U.S. PATENT DOCUMENTS

| | | | | |
|---|---|---|---|---|
| 4,467,436 A | * | 8/1984 | Chance et al. | 700/249 |
| 5,193,963 A | * | 3/1993 | McAffee et al. | 414/5 |
| 5,245,263 A | * | 9/1993 | Tsai et al. | 318/568.1 |
| 5,348,471 A | * | 9/1994 | Notomi | 433/57 |
| 5,789,890 A | | 8/1998 | Genov et al. | |
| 6,339,969 B1 | * | 1/2002 | Salcudean et al. | 74/490.05 |
| 6,366,830 B2 | * | 4/2002 | Bacchi et al. | 700/250 |
| 6,377,013 B2 | * | 4/2002 | Suzuki | 318/568.1 |
| 6,454,624 B1 | * | 9/2002 | Duff et al. | 446/91 |

* cited by examiner

Primary Examiner—Karen Masih
(74) Attorney, Agent, or Firm—Jordan and Hamburg LLP

(57) ABSTRACT

In an industrial robot having a plurality of arms, each arm is coupled with other elements such as a mounting base, another arm, a robotic hand, and revolved by a motion of a revolving joint. A motor for moving the revolving joint, an encoder for sensing a rotation angle of a drive shaft of the motor, and a control circuit for controlling the driving of the motor are provided on the same arm. A signal cable for transmitting a sensing signal of the encoder to the control circuit is terminated at the control circuit on the same arm. There is no need to align the signal cable from the encoder to a main control circuit provided in the mounting base.

3 Claims, 3 Drawing Sheets

MULTI-JOINT TYPE INDUSTRIAL ROBOT AND ARM UNIT THEREOF

BACKGROUND OF THE INVENTION

1. Field of the Invention

The present invention relates to a multi-joint type industrial robot with a plurality of arms respectively coupled by a plurality of revolving joints, which is used, for example, for conveying semiconductor wafers in manufacturing process of semiconductor devices, and relates to an arm unit of the industrial robot.

2. Description of the Related Art

An industrial robot with a plurality of revolving joints which are horizontally arranged is conventionally used for conveying works such as semiconductor wafers in a manufacturing facility of semiconductor devices. A configuration of the conventional industrial robot 81 with a plurality of joints is illustrated in FIGS. 4 and 5. In the industrial robot 81, a first motor 83 is provided in a mounting base 82. A first arm 84 is coupled with a drive shaft 83a of the first motor 83 in the vicinity of an end of the first arm 84. A second motor 85 is provided in the vicinity of another end of the first arm 84. A second arm 86 is coupled with a drive shaft 85a of a second motor 85 in the vicinity of an end of the second arm 86. A third motor 87 is provided in the vicinity of another end of the second arm 86. A robotic hand 88 for nipping a work such as a semiconductor wafer is coupled with a drive shaft 87a of the third motor 87 in the vicinity of an end of the robotic hand 88.

The first arm 84 is revolved by rotation force of the first motor 83. The second arm 86 is revolved by rotation force of the second motor 85. The robotic hand 88 is revolved by rotation force of the third motor 87. A sensor 89 for sensing the existence of the work is provided in the vicinity of a top end of the robotic hand 88.

A driving controller 90 is further provided in the mounting base 82. Electric cables 91, 92 and 93 are respectively provided for supplying the electric powers and driving signals to the first to third motors 83, 85 and 87. Furthermore, an electric cable 94 is provided for coupling the sensor 89 and the driving controller 90.

In the conventional industrial robot 81, the electric cables 92 to 94 are directly connected from the driving controller 90 to the motors 85 and 87 and the sensor 89, which are provided on the arms 84 and 86 and the robotic hand 88, so that the number of electric cabled drawn out from the mounting base 82 becomes larger. Since the electric cables 92 to 94 are aligned along the lengthwise directions of the arms 84 and 86 and the robotic hand 88, the electric cables 92 to 94 are easily broken down, and the alignment of the electric cables 92 to 94 becomes complex. And especially, when the number of the arms increases, the number of the motors also increases. Thus, the number of the electric cables drawn out from the mounting base and the coupled with the electric elements such as the motors will be increased in proportion to the number of arms. In the industrial robot with many arms, the breaking of electric cables is incident much easier, and the arrangement of the electric cables becomes much more complex.

SUMMARY OF THE INVENTION

An object of the present invention is to provide an industrial robot with a plurality of joints, by which the number of electric cables directly drawn out from the mounting base can be reduced so that the breaking of electric cables rarely occurs and the arrangement of the electric cables becomes easier.

An industrial robot in accordance with an aspect of the present invention has a plurality of arms coupled by a plurality of revolving joints, each of the arms can be moved by a driving force of a motor which drives each of the revolving joints. The industrial robot comprises a plurality of control circuits for controlling the motors which are provided on respective of the arms. The control circuits are respectively provided on the same arms as the motors are provided.

By such a configuration, the control circuit for controlling the driving of the motor, which is separated from a main control circuit for controlling whole of the industrial robot, is provided on the same arm as the motor is provided, so that a signal cable used for controlling the motor is only connected between the motor and the control circuit, so that the signal cable can be shortened. Since, there is no need to connect the signal cables between the motors and the main control circuit, the alignment of the control signal cables can be simplified, and the breaking of cables rarely occurs even when the arm is moved and the total length of the cables can be shortened.

DETAILED DESCRIPTION OF THE EMBODIMENT

Figure 1:
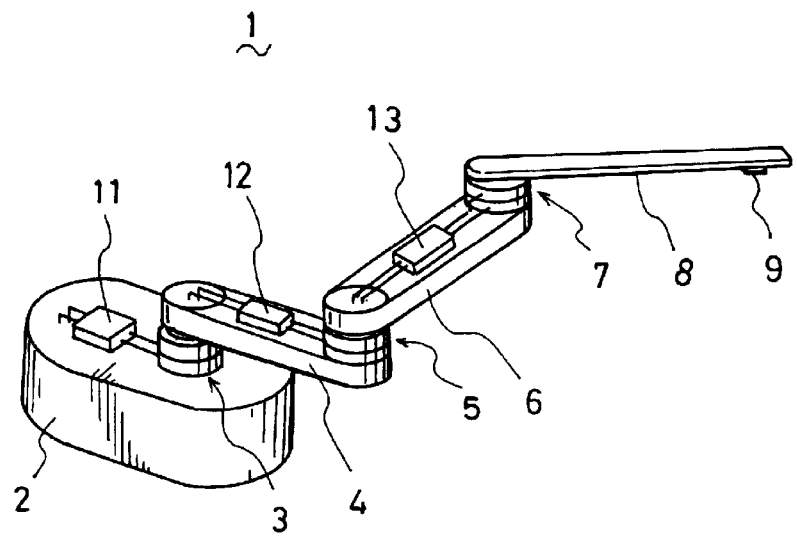
FIG. 1 is a perspective view showing an appearance of an embodiment of a multi-joint type industrial robot in accordance with the present invention.

An embodiment of a multi-joint type industrial robot in accordance with this invention is described. FIG. 1 shows an appearance of the industrial robot in this embodiment. The industrial robot 1 comprises a mounting base 2 which will be fixed on a floor of a manufactory, a first revolving joint 3, a first arm 4 coupled with the mounting base 2 by the first revolving joint 3, a second revolving joint 5, a second arm 6 coupled with the first arm 4 by the second revolving joint 5, a third revolving joint 7 and a robotic hand 8 coupled with the second arm 6 by the third revolving joint 7. The robotic hand 8 is used for nipping a work such as a semiconductor wafer (not shown in the figure). A sensor 9 for sensing the existence of the work is provided in the vicinity of a top end of the robotic hand 8.

The first arm 4 is coupled with the first revolving joint 3 in the vicinity of a base end thereof, so that the first arm 4 can revolve around a rotation axis of the first revolving joint 3 in a horizontal plane. The second revolving joint 5 is provided in the vicinity of a top end of the first arm 4. The second arm 6 is coupled with the second revolving joint 5 in the vicinity of a base end thereof, so that the second arm 6 can revolve around a rotation axis of the second revolving joint 5 in a horizontal plane. The third revolving joint 7 is provided in the vicinity of a top end of the second arm 6. The robotic hand 8 is coupled with the third revolving joint 7 in the vicinity of a base end thereof, so that the robotic hand 8 can revolve around a rotation axis of the third revolving joint 7 in a horizontal plane.

A first control circuit 11 for controlling the driving of the first revolving joint 3 is provided on an upper face of the mounting base 2. A second control circuit 12 for controlling the driving of the second revolving joint 5 is provided on the first arm 4. A third control circuit 13 for controlling the driving of the third revolving joint 7 is provided on the second arm 6. The control circuits 11 to 13 are respectively configured by a microcomputer system with a CPU (central processing unit) serving as several functional elements, a ROM (read only memory) for memorizing a predetermined control program, and a RAM (random access memory) for memorizing several control data such as revolution angles of the arms.

Figure 2:
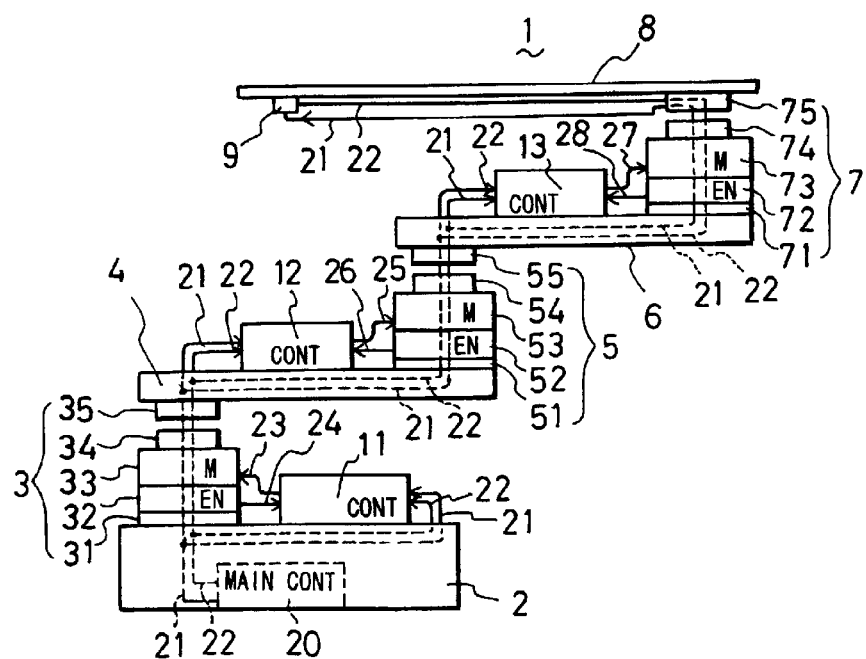
FIG. 2 is a side view showing a state of the industrial robot decomposed at revolving joints in the embodiment.

FIG. 2 shows the industrial robot 1 decomposed at revolving joints. The first arm 4 is detachable from the mounting base 2 at the first revolving joint 3. The second arm 6 is detachable from the first arm 4 at the second revolving joint 5. The robotic hand 8 is detachable from the second arm 6 at the third revolving joint 7.

The first revolving joint 3 comprises a slip ring 31, an encoder 32, a motor 33, and a coupler 34 which configure a first unit provided on the mounting base 2, and a coupler 35 which configures a second unit provided on the first arm 4. The coupler 34 is fixed on a drive shaft 331 of the motor 33 (see FIG. 3), and it is rotated by rotation of the drive shaft of the motor 33. On the other hand, the coupler 35 is fixed on a bottom face (second main face) of the first arm 4. By coupling the coupler 34 with the coupler 35, the first arm 4 is coupled with the mounting base 2 by the first revolving joint 3.

When the motor 33 is driven under coupling the couplers 34 and 35, the first arm 4 is revolved corresponding to a movement (rotation) of the first revolving joint 3 by the driving force of the motor 33. Electric power for driving the motor 33 is supplied from the first control circuit 11 via an electric cable 23. The encoder 32 senses a rotation angle of the drive shaft of the motor 33, that is, the revolution angle of the first arm 4, and outputs a sensing signal corresponding to the revolution angle of the first arm 4 via a signal cable 24. The signal cable 24 for transmitting the sensing signal to the first control circuit 11 is terminated in the first arm 4. In comparison with the conventional robot arm, the signal cable for transmitting the sensing signal from the encoder to the main control circuit can be shortened. Furthermore, the signal wire connected between the encode and the control circuit never be twisted itself or wound around the revolving joint Similarly, the second revolving joint 5 comprises a slip ring 51, an encoder 52, a motor 53, and a coupler 54 which configure a first unit provided on a top face (first main face) the first arm 4, and a coupler 55 which configures a second unit provided on a bottom face (second main face) of the second arm 6. When the motor 53 is driven under coupling of the couplers 54 and 55, the second arm 6 is revolved corresponding to a movement of the second revolving joint 5 by the driving force of the motor 53. Electric power for driving the motor 53 is supplied from the second control circuit 12 via an electric cable 25. The encoder 52 senses a rotation angle of the drive shaft of the motor 53, that is, the revolution angle of the second arm 6, and outputs a sensing signal corresponding to the revolution angle of the second arm 6 via a signal cable 26.

The third revolving joint 7 comprises a slip ring 71, an encoder 72, a motor 73, and a coupler 74 which configure a first unit provided on a top face (first main face) of the second arm 6, and a coupler 75 which configures a second unit provided on a bottom face of the robotic hand 8. When the motor 73 is driven under coupling the couplers 74 and 75, the robotic hand 8 is revolved corresponding to a movement of the third revolving joint 7 by the driving force of the motor 73. Electric power for driving the motor 73 is supplied from the third control circuit 13 via an electric cable 27. The encoder 72 senses a rotation angle of the drive shaft of the motor 73, that is, the revolution angle of the robotic hand 8, and outputs a sensing signal corresponding to the revolution angle of the robotic hand 8 via a signal cable 28.

The first arm 4 is detachable from the mounting base 2 at the first revolving joint 3 and from the second arm 6 at the second revolving joint 5. The second arm 6 is detachable from the first arm 4 at the second revolving joint 5 and from the robotic hand 8 at the third revolving joint 7. The first arm 4 is unitized with at least the motor 53, the second control circuit 12 and the encoder 52. The second arm 6 is unitized with at least the motor 73, the third control circuit 13 and the encoder 72. The couplers 34, 54 and 74 have the same shape. The couplers 35, 55 and 75 have the same shape, which can be coupled with the couplers 34, 54 and 74. When an arm unit with a motor, an encoder and a control circuit can be used as the unitized first arm 4 and the unitized second arm 6, the unitized first arm 4 and the unitized second arm 6 of the industrial robot 1 are interchangeable with each other or with another arm unit.

A main control circuit 20 for controlling whole the industrial robot 1 is provided in an inside of the mounting base 2. The main control circuit 20 is configured by a microcomputer system for generating control signals and an electric power supply for generating electric powers for driving the motors. The electric powers are supplied to the control circuits 11 to 13 via electric power cables 22 from the main control circuit 20. The control signals are transmitted to the control circuits 11 to 13 via the control signal cables 21 from the main control circuit 20. As mentioned above, the control circuits 11 to 13 and the main control circuit 20 are configured by the microcomputer system, so that the control signals can be transmitted to the control circuits 11 to 13 in parallel. The control signal cables 21 can be configured by, for example, a serial bus cable. In this description of the embodiment, the term "cable" is a bundle of a plurality of wires.

In this embodiment, the control circuits 12 and 13 of the motors 53 and 73 for driving the second and third revolving joints 5 and 7 are respectively provided on the first and second arms 4 and 6. By such a configuration, the signal cables 26 and 28 drawn from the encoders 52 and 72 and for transmitting the sensing signals corresponding to the revolution angles of the arms 4 and 6 are respectively terminated at the control circuits 12 and 13 in the arms 4 and 6. In other words, there is no need to align the signal cables 26 and 28 to the main control circuit 20.

Figure 3:
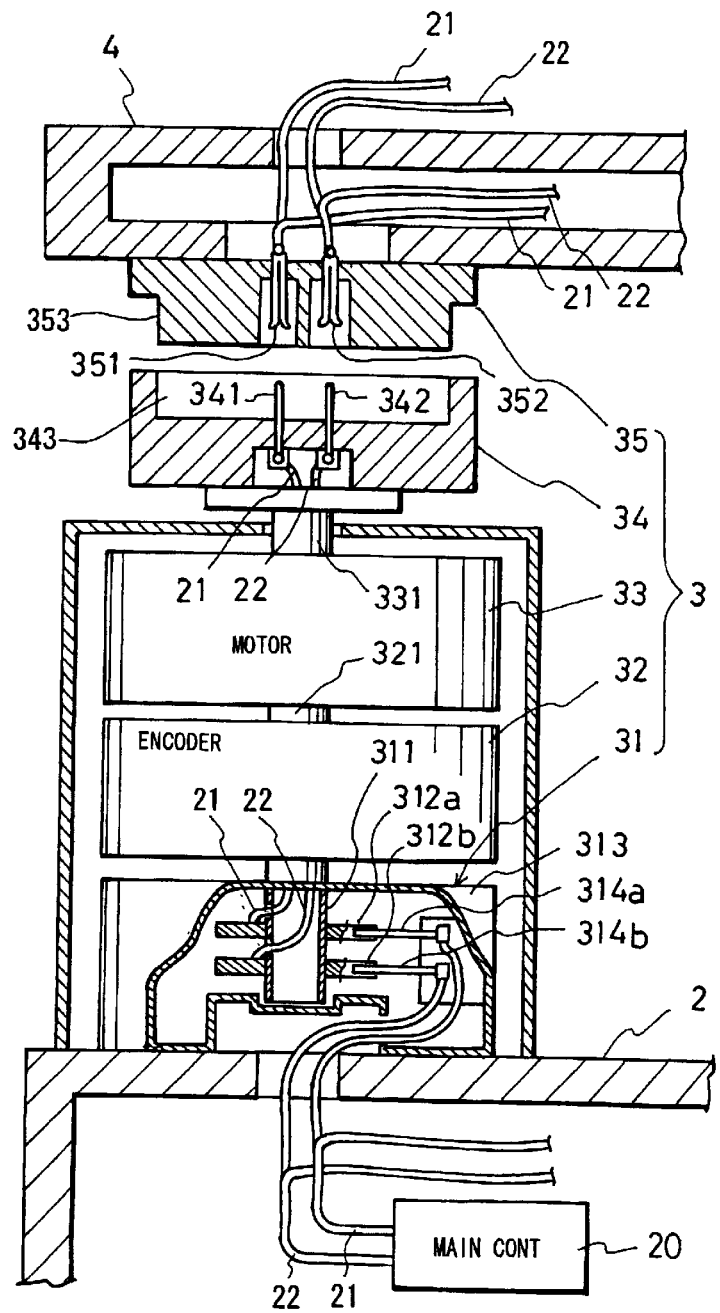
FIG. 3 is a cross sectional view showing a wiring configuration in a portion of a first revolving joint of the industrial robot in the embodiment.
Figure 4:
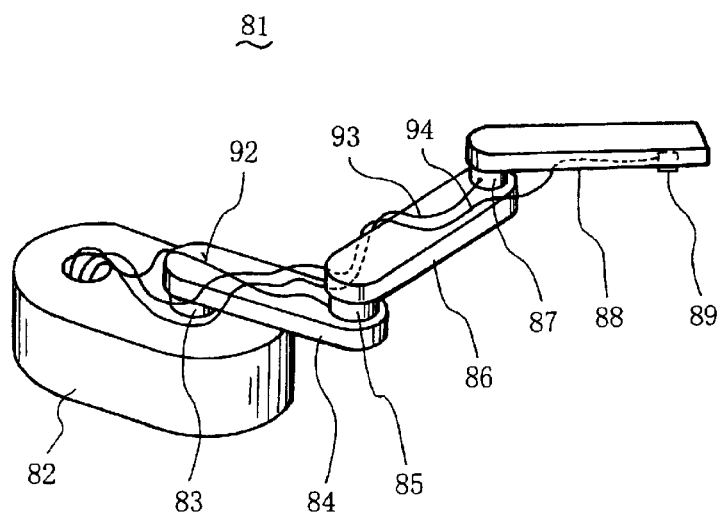
FIG. 4 is a perspective view showing an appearance of a conventional industrial robot.
Figure 5:
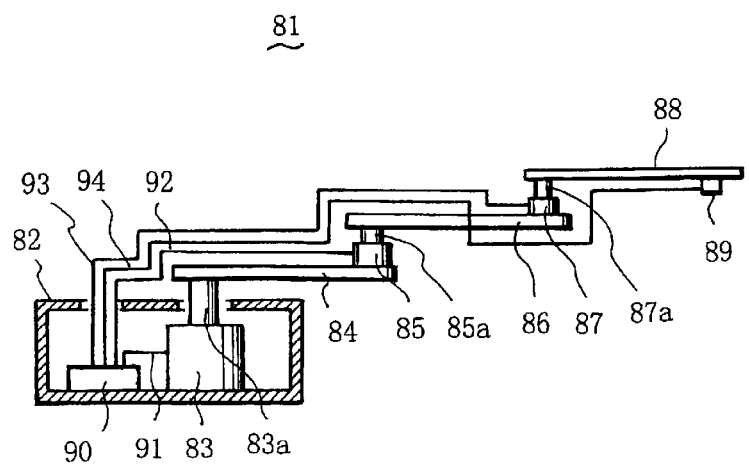
FIG. 5 is a partially sectional side view showing a wiring configuration of the conventional industrial robot.

FIG. 3 shows a configuration in a portion of the first revolving joint 3. As can be seen from FIG. 3, the drive shaft 331 of the motor 33 is directly coupled with a rotation shaft 321 of the encoder 32 and a rotation shaft 311 of the slip ring 31 so as to rotate the rotation shafts 311 and 321 with the rotation of the drive shaft 331. The drive shaft 331 and the rotation shafts 321 and 311 are hollow shafts so that a part of the control signal cable 21 and a part of the electric power cable 22 are aligned therein. The wires of the control signal cable 21 aligned in the inside of the shaft 311 are connected to current collecting rings 312*a* fixed on an outside face of the rotation shaft 311 of the slip ring 31. The wires of the electric power cable 22 aligned in the inside of the shaft 311 are connected to current collecting rings 312*b* fixed the outside face of the rotation shaft 311. In FIG. 3, only one of the current collecting rings 312*a* and 312*b* are respectively illustrated for simplifying the illustration.

On the other hand, another part of the control signal cable 21 and another part of the electric power cable 22 which are directly drawn from the main control circuit 20 provided in the inside of the mounting base 2 are put into an inside of a housing 313 of the slip ring 31. The wires of the control signal cable 21 drawn from the main control circuit 20 are connected to brushes 314*a* provided on an inner face of the housing 313, and the brushes 314*a* are contacted with the current collecting rings 312*a*. The wires of the electric power cable 22 drawn from the main control circuit 20 are connected to brushes 314*b* on the inner face of the housing 313, and the brushes 314*b* are contacted with the current collecting rings 312*b*. While the rotation shaft 311 is rotated, the bushes 314*a* and 314*b* respectively slide on the outer faces of the current collecting rings 312*a* and 312*b* with the electrical contacts. Thus, the part of the control signal cable 21 and the part of the electric power cable 22 directly drawn from the main control circuit 20 are electrically connected to the part of the control signal cable 21 and the part of the electric power cable 22 aligned in the inside of the rotation shaft 311 via the brushes 314*a* and 314*b* and the current collecting rings 312*a* and 312*b*, while the rotation shaft 311 has been rotated.

The part of the control signal cable 21 and the part of the electric power cable 22 connected to the current collecting rings 312*a* and 312*b* are aligned through the insides of the rotation shaft 311 of the slip ring 31, the rotation shaft 321 of the encoder 32 and the drive shaft 331 of the motor 33 so as to be connected to connectors 341 and 342 of the coupler 34. For example, the connectors 341 and 342 are male connectors which are to be connected to female connectors 351 and 352 of the coupler 35. The coupler 34 has a concave coupling structure 343, and the connectors 341 and 342 are disposed at a center portion of the concave coupling structure 343. The coupler 35 has a convex coupling structure 353, and the connectors 351 and 352 are disposed at a center portion of the convex coupling structure 353. When the coupler 35 is coupled with the coupler 34, the connectors 341 and 342 are respectively connected to the connectors 351 and 352. The connectors 341, 342, 351 and 352 respectively have a plurality of contacts corresponding to the number of wires of the control signal cable 21 and the electric power cable 22.

In the inside of the first arm 4, the control signal cable 21 and the electric power cable 22 are branched in two ways at the connectors 351 and 352. In other words, two sets of the control signal cable 21 and the electric power cable 22 are connected to the connectors 351 and 352. One set of the control signal cable 21 and the electric power cable 22 (one way) is put out from the inside of the first arm 4 and connected to the second control circuit 12 (see FIG. 1 or 2). The other set of the control signal cable 21 and the electric power cable 22 (the other way) is aligned in an inside of the first arm 4. By such a configuration, the control signal cable 21 and the electric power cable 22 are never twisted, even when the first arm 4 is revolved by driving the motor 33.

With reference to FIG. 2, in a portion of the second revolving joint 5, a part of the control signal cable 21 and a part of the electric power cable 22 aligned in the inside of the first arm 4 are connected to still another part of the control signal cable 21 and still another part of the electric power cable 22 aligned in the insides of shafts (not shown, but substantially the same as the shafts 311, 321 and 331) of the slip ring 51, the encoder 52 and the motor 53 via brushes and current collecting rings (not shown, but substantially the same as the brushes 314*a* and 314*b* and the current collecting rings 312*a* and 312*b*) provided in the slip ring 51. The part of the control signal cable 21 and the part of the electric power cable 22 aligned in the shafts are connected to connectors (not shown, but substantially the same as the connectors 341 and 342) of the coupler 54. When the coupler 55 is coupled with the coupler 54, connectors (not shown, but substantially the same as the connectors 351 and 352) of the coupler 55 are electrically connected to the connectors of the coupler 54, so that the part of the control signal cable 21 and the part of the electric power cable 22 aligned in the inside of the shafts are electrically connected to the connectors of the coupler 55.

In the inside of the second arm 6, the control signal cable 21 and the electric power cable 22 are branched in two ways at the connectors 551 and 552. Two sets of a control signal cable 21 and an electric power cable 22 are respectively connected to the connectors of the coupler 55. One set of the control signal cable 21 and the electric power cable 22 (one way) is put out from the inside of the second arm 6 and connected to the second control circuit 13. The other set of the control signal cable 21 and the electric power cable 22 (the other way) is aligned in the inside of the second arm 6.

In a portion of the third revolving joint 7, a part of the control signal cable 21 and a part of the electric power cable 22 aligned in the inside of the second arm 6 are connected to still another part of the control signal cable 21 and still another part of the electric power cable 22 aligned in the insides of shafts (not shown, but substantially the same as the shafts 311, 321 and 331) of the slip ring 71, the encoder 72 and the motor 73 via brushes and current collecting rings (not shown, but substantially the same as the brushes 314*a* and 314*b* and the current collecting rings 312*a* and 312*b*) provided in the slip ring 71. The part of the control signal cable 21 and the part of the electric power cable 22 aligned in the shafts are connected to connectors (not shown, but substantially the same as the connectors 341 and 342) of the coupler 74. When the coupler 75 is coupled with the coupler 74, connectors (not shown, but substantially the same as the connectors 351 and 352) of the coupler 75 are electrically connected to the connectors of the coupler 74, so that the part of the control signal cable 21 and the part of the electric power cable 22 aligned in the inside of the shafts are electrically connected to the connectors of the coupler 75. One set of a control signal cable 21 and an electric power cable 22 are respectively connected to the connectors of the coupler 75. The part of the control signal cable 21 and the part of the electric power cable 22 connected to the connectors of the coupler 75 are put out from the coupler 75 and aligned along the lengthwise direction of the robotic arm 8 so as to be connected to the sensor 9.

In the industrial robot 1 configured above, the control signals are transmitted and the electric powers are supplied from the main control circuit 20 provided in the mounting base 2 for controlling the whole of the industrial robot 1 to the first to third control circuit 11 to 13 via the control signal cables 21 and the electric power cables 22. The motors 33, 53 and 73 are respectively driven under the control by the control circuit 11 to 13. The first arm 4, the second arm 6 and the robotic hand 8 are respectively revolved by predetermined revolution angles corresponding to the control signals. Since only the control signal cables 21 and the electric power cables 22 are drawn out from the mounting base 2, the alignment of the cables and the cables can be simplified, and the breaking of cables rarely occurs and the total length of the cables and cables can be shortened. Furthermore, the first to third control circuits 11 to 13 for controlling the driving of the motors 33, 53 and 73 are separated from the main control circuit 20, so that the mounting base 2 can be downsized.

In the above-mentioned embodiment, the lengths of the first arm 4 and the second arm 6 are not referred. In the present invention, it is possible to select the lengths of the arms optionally as occasion demands.

In the above-mentioned embodiment, the control signal cables 21 and the electric power cable 22 are branched at the connectors of the couplers 35, 55 and 75. Thus, only one set of the control signal cables 21 and the electric power cable 22 are drawn from each of the mounting base 2, the first arm 4, the second arm 6 and the robotic hand 8. Even when the numbers of the arms and the motors for driving the revolving joints are increased, the number of cables and cables drawn out from each arm is the same. It is possible to compose an optional industrial robot with an optional number of revolving joints without increasing the number of the cables and the cables drawn out from the mounting base.

This application is based on patent application 2001-305704 filed in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An industrial robot, comprising:

a plurality of arms coupled by a plurality of revolvable joints;

motors provided on respective ones of the arms, each of said arms being movable in response to a driving force imparted by respective one of the motors to each of the revolvable joints;

control circuits for controlling the motors each being provided on a same arm of said plurality of arms as a corresponding one of the motors to be controlled thereby;

a main control circuit for controlling whole of the industrial robot;

control signal cables respectively connected between the main control circuit and the control circuits and for transmitting control signals used for controlling the motors;

electric power cables respectively connected between the main control circuit and the control circuits and for supplying electric powers used for driving the motors;

signal cables for transmitting signals corresponding to motions of respective of the arms owing to the driving forces of the motors to the control circuits, each of the signal cables being terminated in each of the arms.

2. The industrial robot in accordance with claim 1, further comprising encoders for sensing rotation angles of drive shafts of the motors, each of the encoders being provided on a same one of the arms on which a respective one of the motors is provided.

3. The industrial robot in accordance with claim 2, further comprising:

a first revolvable joint for rotationally coupling a mounting base of the industrial robot and a first arm;

a second revolvable joint for rotationally coupling the first arm and a second arm; and a third revolvable joint for rotationally coupling the second arm and a robotic hand; and wherein each of the revolvable joints has a slip ring for electrically connecting respective ones of the control signal cables and the electric power cables from the main control circuit, and a coupler for detachably dividing the revolvable joint in two portions; and the control signal cables and the electric power cables are aligned in hollow portion of the revolvable joints and inside of the arms.

* * * * *